July 4, 1939.  J. S. FRECHETTE  2,165,095
HYDROPNEUMATIC JACK
Filed Sept. 3, 1936  2 Sheets-Sheet 1
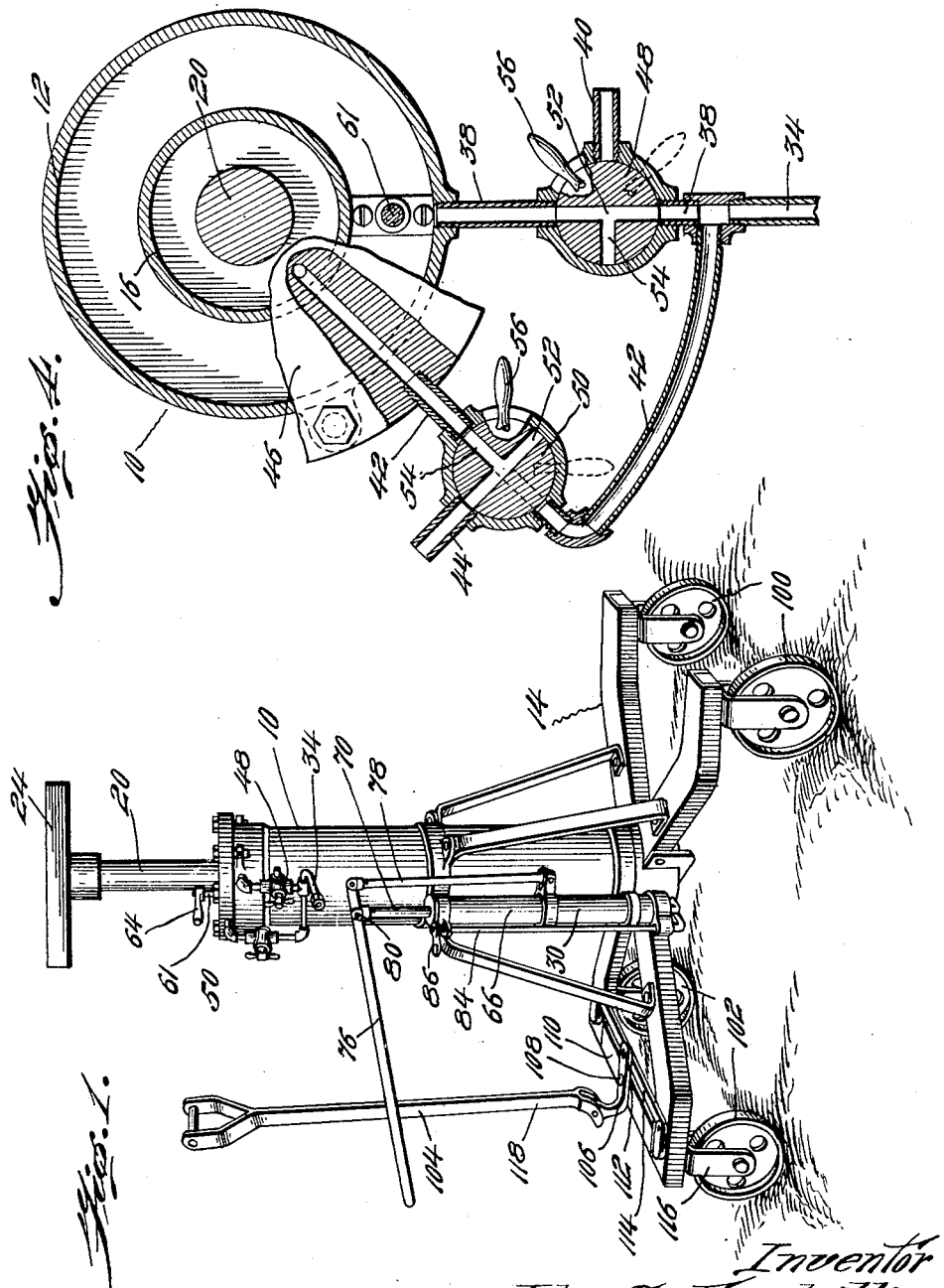
Inventor
John S. Frechette
By Thomas A. Jenkes
Attorney July 4, 1939.   J. S. FRECHETTE   2,165,095
HYDROPNEUMATIC JACK
Filed Sept. 3, 1936   2 Sheets-Sheet 2
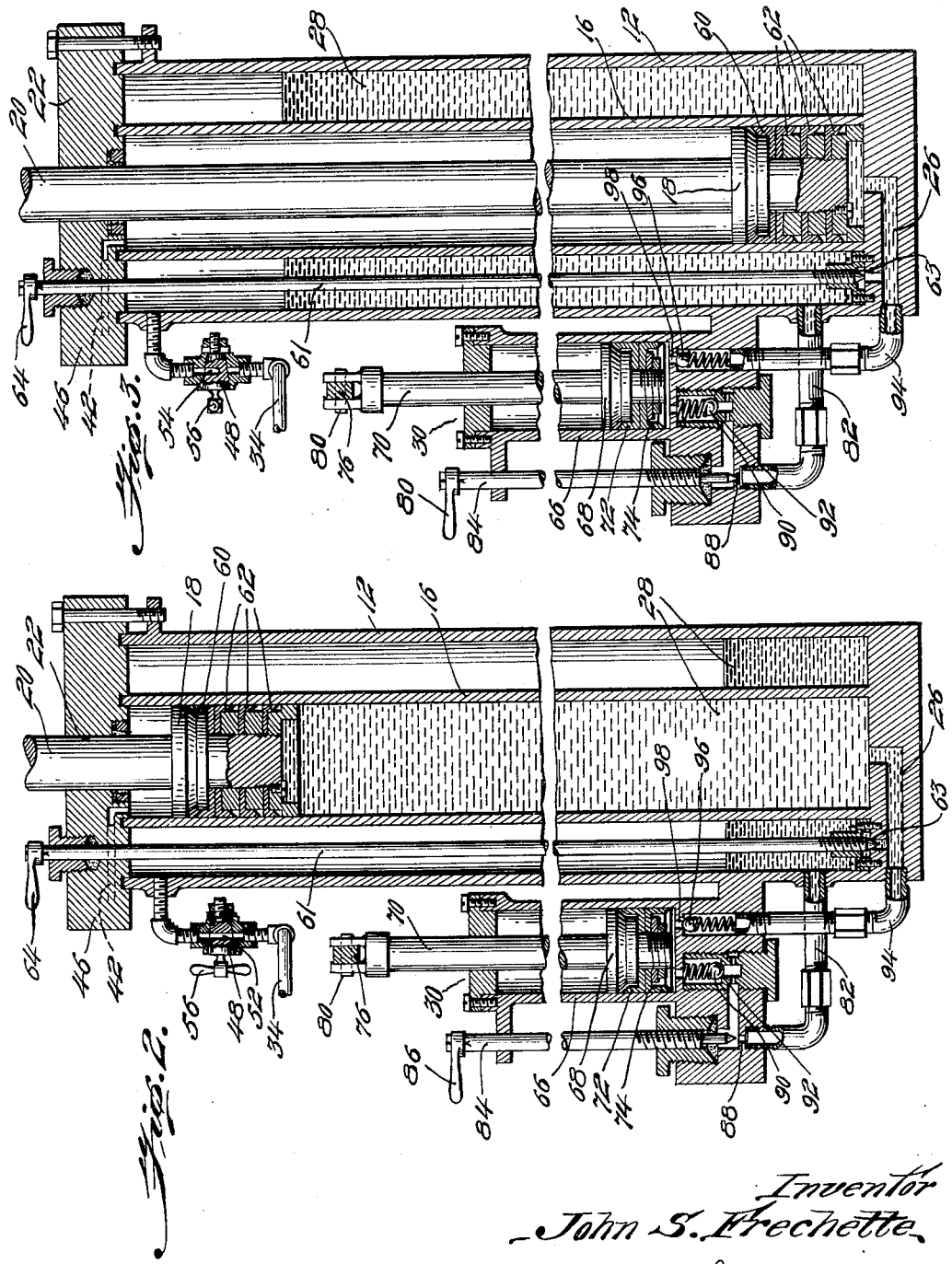

Patented July 4, 1939

2,165,095

UNITED STATES PATENT OFFICE 2,165,095

HYDROPNEUMATIC JACK

John S. Frechette, Providence, R. I.

Application September 3, 1936, Serial No. 99,256

9 Claims. (Cl. 60—52)

My invention relates to improvements in power plants of the pneumatic hydraulic type.

An object of my invention is to provide an hydraulic power plant operated by compressed air which is compact, strong and quick in its action.

A further object of my invention is to provide a power plant of this description so arranged as to positively raise and positively lower the work piston rod thereof. While various power plants of the hydraulic pneumatic type have been provided to positively raise the work piston thereof, so far as I am aware, none have been provided which may be so connected that the compressed air will function to positively lower the work piston rod.

A further feature of my invention is to provide such an hydraulic pneumatic power plant with a hand-operated booster hydraulic pump provided with a piston of relatively small diameter for the quick supplemental and additive raising of the piston rod. Most standard types of air compressors only generate a pressure of about 1300 pounds, not sufficient for many purposes, and while the source of compressed air may be readily used where a light amount of work is to be accomplished, it is apparent that with my improved booster mechanism my improved power plant may generate pressures up to 8000 pounds or more for lifting or otherwise doing heavier work.

Further features of my invention are to provide a power plant of the above description which is easily operated at a small maintenance cost and is quick and powerful in its action. It is also apparent that with my improved power plant, if sources of compressed air are not available, the hand-operated hydraulic pump itself may be employed to solely generate the pressure.

My invention is peculiarly adapted for use in automotive jacks, particularly those of the portable type adapated for heavy duty service such as in raising buses or trucks for use in bus or truck garages where a source of compressed air is available and which in many instances is by itself sufficient to lift one corner of a truck or otherwise to do the necessary work. If my invention, however, is equipped with a supplemental hand-operated booster liquid pump, it is obvious that it may be employed, if desired, to lift quickly an entire bus or truck. In a particular instance where my invention has been employed, a large traction bus fell into a pit and was quickly lifted out of the pit in forty minutes, whereas formerly with the use of the ordinary hydraulic jacks now on the market or hand-jacks it had required a period of over three hours.

A further feature of my improved power plant, particularly when employed as a jack, is to provide a portable permanent four-point support for the jack at all times so that it will not tend to tip over and to maintain a continuous four-point support for the jack, I so pivot the front wheels that the jack may be readily and quickly moved to any desired position.

These and such other objects of my invention as may hereinafter appear will be best understood from a description of the accompanying drawings which illustrate an embodiment thereof.

In the drawings, Fig. 1 is a perspective view of my improved hydraulic pneumatic power plant employed as a portable jack.

Fig. 2 is a vertical sectional view thereof showing the piston rod in substantially raised position and the booster hand-operated liquid pump connected to the cylinder to still force the piston upwards on actuation thereof.

Fig. 3 is a vertical sectional view of the parts of my invention shown in Fig. 2 with the booster oil pump cut off and the compressed air connected to the top of the cylinder to positively force the piston and its rod downwards to the lowered position of the jack.

Fig. 4 is a diagrammatic cross sectional view taken through the top of the cylinder and reservoir illustrating the conduit means connected to the source of compressed air having branch conduit means leading to both the cylinder and reservoir respectively, and the type of valves I preferably employ in each of said branch conduit means to connect said respective reservoir and cylinder alternatively to the source of compressed air or to atmosphere for exhaust.

In the drawings, wherein like characters of reference generally indicate like parts throughout, 10 generally indicates an hydraulic pneumatic power plant constructed in accordance with the principles of my invention mounted on a suitable portable base frame to function as a jack. It is obvious, however, that my improved pneumatic hydraulic power plant may be employed in a press, to actuate elevators, hoists or cranes, or for any other like purpose.

My improved power plant includes a liquid containing reservoir 12, in the embodiment shown, mounted on the base frame 14 and the cylinder 16 also mounted on said base frame 14, in my preferred embodiment said reservoir 12 being annular and said cylinder 16 being mounted centrally of said reservoir 12. The piston 18 is provided to vertically reciprocate within said cylinder 16 and is provided with a work piston rod 20 projecting upwardly through a suitable hole 22 in the upper end of said cylinder. When employed as a jack, as shown in Fig. 1, the upper end of said piston 20 is provided with a suitable jack head or cradle 24. Conduit means 26 are provided to connect the lower end of said reservoir 12 with the lower end of said cylinder 16.

In the broader aspects of my invention, I provide suitable means to admit air under pressure to the top of said reservoir 12 to force liquid 28, such as oil, it being obvious that any other suitable type of liquid may be employed, through said conduit means 26 from said reservoir 12 to within said cylinder 16 below said piston 18 to lift said piston and to simultaneously discharge air from said cylinder 16 above said piston 18, and I provide (a feature which I believe is novel) means to admit air under pressure to the top of the cylinder 16 to positively lower said piston 18, thereby forcing the liquid 28 from the lower portion of said cylinder 16 through the conduit means 26 to the lower portion of the reservoir 12 and to simultaneously discharge air from the top of said reservoir 12 to provide means to positively force the piston and its rod downwards in a relatively short period of time. As stated hitherto, I may also provide in combination with the hydraulic pneumatic power plant hitherto described a hand-operated hydraulic booster pump adapted to be used additively or alternatively with the source of compressed air for raising the piston rod 20, and for this purpose I provide means to disconnect the conduit means 26 connecting said reservoir 12 and cylinder 16 and the hand-operated hydraulic booster pump is connectable to said reservoir 12 and the lower end of the cylinder 16 to pump liquid from said reservoir 12 to the lower end of said cylinder 16 to additively raise said jack under greater loads. I preferably provide in combination therewith means to prevent backflow of liquid from said booster pump 30 to said reservoir 12 and said main cylinder 16 to said booster pump 30 during operation of said booster pump. The means I provide to admit air under pressure to the top of the cylinder 12 to positively lower said piston may only be operated when the booster pump 30 is disconnected and the cylinder 16 is again directly connected to the reservoir 12 by the conduit means 26.

In my preferred embodiment, I preferably construct the means hitherto described as follows: I provide suitable conduit means 34 provided with a suitable coupling 36 for receiving the end of a pipe connected to a source of compressed air (not shown), said conduit means 34 being thus connectable to a source of air under pressure. Said conduit means 34 is provided with a branch 38 having an exhaust port 40, said branch being connected to the top of the reservoir 12 and a branch 42 having an exhaust port 44, said branch being connected to the top of the cylinder 16 above said piston 18, in the preferred embodiment, through the cylinder head 46. Valve means 48 and 50 are provided in said branches 38 and 42 movable from positions connecting said respective reservoir 12 and cylinder 16 with said conduit means 34 to admit air therein respectively, to positions connecting said respective reservoir 12 and cylinder 16 with the respective exhaust ports 40 and 44 of said branches 38 and 42. For this purpose, each of said valve means 48 and 50 is provided with the hole 52 extending diametrically therethrough for use in directly connecting opposite ends of said respective branch conduit means 38 and 42 to receive air directly through the compressed air inlet conduit 34 and said valves 48 and 50 are also provided with a supplemental hole 54 at right angles to said diametric hole 52 to provide a right angle hole through said respective valves 48 and 50 to conduct air from each respective reservoir 12 and cylinder 16 through said valves and out of said respective exhaust ports 40 and 44. When the handle 56 of the respective valve means is moved to a position bringing the port 54 in alignment with the inner branch conduit 38 or 42 to permit air to discharge through the respective exhaust ports 40 or 44 through the adjacent end of the diametric hole 52, the opposite end of the diametric hole 52 is blocked by the valve casing. In Fig. 4, I have shown the device in full lines in a lifting position with the handle of the valve 48 moved to the position shown in full lines to connect said diametric port 52 with opposite ends of the branch conduit 38 to admit air directly to the reservoir 12 and I have shown the valve 50 in a position permitting discharge from the cylinder 16 through the hole 54, the end of the diametric hole 52, the exhaust port 44 and the handle 56 of the valve 50 being shown in full lines in this position. Thus in the full line position shown in Fig. 4, it is obvious that air will be admitted to the top of the reservoir 12 to force liquid down the reservoir 12 through the connecting conduit means 26 and up the cylinder 16 to force the piston 18 upwards, the valve 50 connected to the top of the cylinder 16 being open to discharge air from the top of the cylinder through the discharge port 44 of the valve 50 as the piston 18 rises. In order to positively lower the piston 18, the respective valves 48 and 50 are moved to the dotted line positions shown by the handles thereof, in which case the diametric hole 52 of the valve 50 is brought into alignment with both ends of the branch conduit 42 to admit air directly to the top of the cylinder 16 to positively force the piston 18 downwards forcing liquid from the cylinder 16 through the conduit means 26 into the reservoir 12, the valve 48 being moved to a position to discharge air through the branch conduit 38, holes 54 and 52 of the valve 48 and out through the exhaust port 40 as it is being forced upwardly within the reservoir 12 by the rising liquid 28. The piston 18 may, if desired, be provided with an oil seal 60 having upwardly directed side walls and with an oil seal 62 having downwardly directed side walls and preferably comprising a plurality of nested seal means, each having downwardly projecting side walls to prevent any respective leakage of air or liquid around the edges of the piston.

As stated hitherto, I may, if desired, provide in combination with my improved air pressure actuated power plant hitherto described a hand-actuated hydraulic booster pump 30 connectable to said reservoir 12 and the lower end of the cylinder 16 to pump liquid from said reservoir 12 to the lower end of said cylinder 16 under greater pressure to additively raise said jack or piston rod 20 under greater loads or to perform the entire work of raising the piston 18 in case a source of compressed air be not available, and when said booster pump is employed, suitable means are provided to disconnect the conduit means 26 connecting said reservoir 12 with said cylinder 16, it being obvious that when said booster pump 30 is connected it will be impossible to positively force the piston 18 and its load downwards by compressed air in the manner hitherto described. To provide means to positively shut off the conduit means 26 connecting the lower ends of said reservoir 12 and cylinder 16, I provide a shut off needle valve 61 for closing the inlet 63 to said connecting conduit 26 from said reservoir extending preferably vertically through the annular reservoir 12 and provided with a turning handle 64 at the upper end thereof.

In the embodiment shown, the hand-operated hydraulic booster pump 30 comprises a cylinder 66 and a piston 68 vertically reciprocal within said cylinder 66 having a piston rod 70 extending vertically upwardly through the upper end of said cylinder 66. Said piston 68 may be provided, if desired, with an oil seal 72 having upwardly directed side walls and an oil seal 74 having downwardly directed side walls to positively prevent leakage of air and oil around the edges of said piston 68. A hand lever 76 has the inner end thereof fulcrumed on a rod 78 projecting vertically upwardly from said cylinder 66 and is suitably pivoted as at 80 to the upper end of said piston rod 70. Conduit means 82 are provided for connecting the lower end of the reservoir 12 with the lower end of the booster cylinder 66. A shut off needle valve 84 provided with a suitable turning handle 86 is provided to close a suitable port 88 in said conduit 82 to positively shut off the booster cylinder if desired. A spring actuated ball check valve 90 is also provided to positively bear against a suitable seat 92 therefor in said conduit 82 to prevent backflow to said reservoir on downward movement of said piston 68 on operation of said booster pump. A conduit 94 is also provided to connect the lower end of said booster cylinder 66 with the lower end of the main cylinder 16 and a spring actuated ball check valve 96 is also provided in said conduit 94 to positively bear against a suitable seat 98 therefor in said conduit to prevent backflow of liquid from said main cylinder 16 to said booster cylinder 66 on raising of said piston 68. It is thus obvious that said respective check valves 90 and 96 provide means to positively prevent backflow of liquid from said booster pump 30 to said reservoir 12 and said main cylinder 16 to said booster pump 30 during operation of said booster pump.

It is thus apparent that I have provided a compact and strong power plant of the hydraulic type which may be operated by compressed air or additively or alternatively actuated by a hand-operated hydraulic booster pump easily operated at a small maintenance cost and quick in its action to positively raise either by hand power or compressed air its piston rod and to positively lower its piston rod when desired by compressed air.

Such a power plant is particularly useful on a jack for automotive purposes, as shown in my preferred embodiment, and when used for this purpose it is highly desirable that the base frame 14 for the jack be not only portable but be provided at all times with four equally spaced points of support. For this purpose, I provide the base frame 14 with a pair of rear wheels 100 mounted on the rear end thereof to rotate on a horizontal axis and a pair of front wheels 102 pivotally mounted on the front end of said base frame to rotate also on a horizontal axis and pivot about a vertical axis, and I provide a handle 104 connected to said front wheels to simultaneously pivot each front wheel about its vertical axis. In my improved embodiment, said handle 104 is provided with a lower portion 106 pivotally mounted centrally as at 108 of a frame end bar 110 and having its rear end pivotally mounted as at 112 on a laterally movable cross bar 114 having the ends thereof pivotally secured to the wheel yokes 116. The handle 104 also comprises an upper portion 118 pivotally secured to the lower portion 106 to pivot thereon in a vertical plane. It is thus obvious that as the handle 104 is swung laterally, the cross bar 114 will be correspondingly swung laterally to pivot the front wheel yokes 116 to simultaneously turn the front wheels 102 to the right or left for steering purposes while maintaining a permanent support for each corner of the frame at any position of the front wheels.

It is apparent, therefore, that I have provided a novel type of hydraulic pneumatic portable power plant and/or jack with the advantages explained above.

It is understood that my invention is not limited to the specific embodiment shown and that various deviations may be made therefrom without departing from the spirit and scope of the appended claims.

What I claim is:

1. A pneumatic hydraulic power plant comprising a liquid containing reservoir, a cylinder, a piston vertically reciprocable within said cylinder having a piston rod extending upwardly therethrough, conduit means connecting the lower end of said reservoir with the lower end of said cylinder, means to admit air under pressure to the top of said reservoir to force liquid into said cylinder to lift said piston, and to simultaneously discharge air from said cylinder above said piston, means to disconnect said conduit means connecting said reservoir and cylinder, and a booster hydraulic hand pump connectable to said reservoir and cylinder lower end to pump liquid from said reservoir to said cylinder lower end under greater pressure to additively raise said piston under greater loads.

2. A pneumatic hydraulic power plant comprising a liquid containing reservoir, a cylinder, a piston vertically reciprocable within said cylinder having a piston rod extending upwardly therethrough, conduit means connecting the lower end of said reservoir with the lower end of said cylinder, means to admit air under pressure to the top of said reservoir to force liquid into said cylinder to lift said piston and to simultaneously discharge air from said cylinder above said piston, means to disconnect said conduit means connecting said reservoir and cylinder, a booster hydraulic hand pump connectable to said reservoir and cylinder lower end to pump liquid from said reservoir to said cylinder lower end under greater pressure to additively raise said piston under greater loads, and means to admit air under pressure to the top of said cylinder to positively lower said piston, thereby forcing liquid into said reservoir and to simultaneously discharge air from said reservoir when said booster pump is disconnected and said cylinder is again directly connected to said reservoir.

3. A pneumatic hydraulic power plant comprising an annular liquid containing reservoir, a cylinder mounted centrally of said reservoir, a piston vertically reciprocable within said cylinder having a piston rod extending upwardly therethrough, conduit means connecting the lower end of said reservoir with the lower end of said cylinder, a shut off valve for closing said conduit means extending vertically through said annular reservoir having a turning handle at the upper end thereof, a hand operated hyldraulic booster pump comprising a cylinder, a piston vertically reciprocable within said cylinder having a piston rod extending upwardly therethrough, a pivotally mounted hand lever having the work arm thereof connectable to said piston rod upper end, a conduit connecting the lower end of said reservoir with the lower end of said booster cylinder, a shut off valve in said conduit, a check valve in said conduit to prevent backflow to said reservoir on operation of said booster pump, a conduit connecting the lower end of said booster cylinder with the lower end of said main cylinder, and check valve in said conduit to prevent backflow from said main cylinder to said booster cylinder.

4. A pneumatic hydraulic power plant comprising an annular liquid containing reservoir, a cylinder mounted centrally of said reservoir, a piston vertically reciprocable within said cylinder having upwardly directed seal means and downwardly directed seal means having a piston rod extending upwardly therethrough, conduit means connecting the lower end of said reservoir with the lower end of said cylinder, a shut off needle valve for closing said conduit means extending vertically through said annular reservoir having a turning handle at the upper end thereof, a hand operated hydraulic booster pump comprising a cylinder, a piston vertically reciprocable within said cylinder having upwardly directed seal means and downwardly directed seal means having a piston rod extending upwardly therethrough, a pivotally mounted hand lever having the work arm thereof of connectable to said piston rod upper end, a conduit connecting the lower end of said reservoir with the lower end of said booster cylinder, a shut off needle valve in said conduit, a check valve in said conduit to prevent backflow to said reservoir on operation of said booster pump, a conduit connecting the lower end of said booster cylinder with the lower end of said main cylinder, and a check valve in said conduit to prevent backflow from said main cylinder to said booster cylinder.

5. A pneumatic hydraulic power plant comprising a liquid containing reservoir, a cylinder, a piston vertically reciprocable within said cylinder having a piston rod extending upwardly therethrough, conduit means connecting the lower end of said reservoir with the lower end of said cylinder, a shut off valve for closing said conduit means extending vertically through said reservoir having a turning handle at the upper end thereof, a hand operated hydraulic booster pump comprising a cylinder, a piston vertically reciprocable within said cylinder having a piston rod extending upwardly therethrough, a pivotally mounted hand lever having the work arm thereof connectable to said piston rod upper end, a conduit connecting the lower end of said reservoir with the lower end of said booster cylinder, a shut off valve in said conduit, a check valve in said conduit to prevent backflow to said reservoir on operation of said booster pump, a conduit connecting the lower end of said booster cylinder with the lower end of said main cylinder, and a check valve in said conduit to prevent backflow from said main cylinder to said booster cylinder.

6. A pneumatic hydraulic power plant comprising a liquid containing reservoir, a cylinder, a piston vertically reciprocable within said cylinder having a piston rod extending upwardly therethrough, conduit means connecting the lower end of said reservoir with the lower end of said cylinder, means to admit air under pressure to the top of said reservoir to force liquid within said cylinder to lift said piston and to simultaneously discharge air from said cylinder above said piston, means to disconnect said conduit means connecting said reservoir and cylinder, a booster hydraulic hand pump connectable to said reservoir and cylinder lower end to pump liquid from said reservoir to said cylinder lower end under greater pressure to additively raise said piston under greater loads, and means to prevent backflow of liquid from said booster pump to said reservoir and from said main cylinder to said booster pump during operation of said booster pump.

7. A pneumatic hydraulic power plant comprising a liquid containing reservoir, a cylinder, a piston vertically reciprocable within said cylinder having a piston rod extending upwardly therethrough, conduit means connecting the lower end of said reservoir with the lower end of said cylinder, means to admit air under pressure to the top of said reservoir to force liquid within said cylinder to lift said piston and to simultaneously discharge air from said cylinder above said piston, means to disconnect said conduit means connecting said reservoir and cylinder, a booster hydraulic hand pump connectable to said reservoir and cylinder lower end to pump liquid from said reservoir to said cylinder lower end under greater pressure to additively raise said piston under greater loads, means to prevent backflow of liquid from said booster pump to said reservoir and from said main cylinder to said booster pump during operation of said booster pump, and means to admit air under pressure to the top of said cylinder to positively lower said piston, thereby forcing liquid within said reservoir and to simultaneously discharge air from said reservoir when said booster pump is disconnected and said cylinder is again directly connected to said reservoir.

8. A pneumatic hydraulic power plant comprising an annular liquid containing reservoir, a cylinder mounted centrally of said reservoir, a piston vertically reciprocable within said cylinder having upwardly directed seal means and a plurality of downwardly directed nested seal means having a piston rod extending upwardly therethrough, conduit means connecting the lower end of said reservoir with the lower end of said cylinder, conduit means connectable to a source of air under pressure having a branch having an exhaust port connected to the top of said reservoir and a branch having an exhaust port connected to the top of said cylinder above said piston, valve means mounted in each of said branches movable from positions connecting said respective reservoir and cylinder with said conduit means to admit air therein to positions connecting said respective reservoir and cylinder with the exhaust, whereby when the respective valve means to said reservoir is connected to said conduit means and the respective valve means to said cylinder is connected to said exhaust port, air may be admitted to said reservoir to force liquid from said reservoir within said cylinder to raise said piston, air from the top of said cylinder discharging from said exhaust port, and when the respective valve means to said cylinder is connected to said conduit means and the respective valve means to said reservoir is connected to said exhaust port, air may be admitted to said cylinder to force said piston down, liquid below said piston discharging within said reservoir, and air from the top of said reservoir discharging from said exhaust port, a shut off needle valve for closing said conduit means extending vertically through said annular reservoir having a turning handle at the upper end thereof, a hand operated hydraulic booster pump comprising a cylinder, a piston vertically reciprocable within said cylinder having upwardly directed seal means and downwardly directed seal means having a piston rod extending upwardly therethrough, a pivotally mounted hand lever having the work arm thereof connectable to said piston rod upper end, a conduit connecting the lower end of said reservoir with the lower end of said booster cylinder, a shut off needle valve in said conduit, a check valve in said conduit to prevent backflow to said reservoir on operation of said booster pump, a conduit connecting the lower end of said booster cylinder with the lower end of said main cylinder, and a check valve in said conduit to prevent backflow from said main cylinder to said booster cylinder.

9. A pneumatic hydraulic power plant comprising a liquid containing reservoir, a cylinder, a piston vertically reciprocable within said cylinder having a piston rod extending upwardly therethrough, conduit means connecting the lower end of said reservoir with the lower end of said cylinder, conduit means connectable to a source of air under pressure having a branch having an exhaust port connected to the top of said reservoir and a branch having an exhaust port connected to the top of said cylinder above said piston, valve means mounted in each of said branches movable from positions connecting said respective reservoir and cylinder with said conduit means to admit air therein to positions connecting said respective reservoir and cylinder with the exhaust, whereby when the respective valve means to said reservoir is connected to said conduit means and the respective valve means to said cylinder is connected to said exhaust port, air may be admitted to said reservoir to force liquid from said reservoir within said cylinder to raise said piston, air from the top of said cylinder discharging from said exhaust port, and when the respective valve means to said cylinder is connected to said exhaust port, air may be admitted to said cylinder to force said piston down, liquid below said piston discharging within said reservoir, and air from the top of said reservoir discharging from said exhaust port, a shut off valve for closing said conduit means extending vertically through said reservoir having a turning handle at the upper end thereof, a hand operated hydraulic booster pump comprising a cylinder, a piston vertically reciprocable within said cylinder having a piston rod extending upwardly therethrough, a pivotally mounted hand lever having the work arm thereof connectable to said piston rod upper end, a conduit connecting the lower end of said reservoir with the lower end of said booster cylinder, a shut off valve in said conduit, a check valve in said conduit to prevent backflow to said reservoir on operation of said booster pump, a conduit connecting the lower end of said booster cylinder with the lower end of said main cylinder, and a check valve in said conduit to prevent backflow from said main cylinder to said booster cylinder.

JOHN S. FRECHETTE.